Oct. 13, 1959     R. J. NEFF     2,908,863
ELECTRONIC LOCATOR
Filed Feb. 18, 1955     3 Sheets-Sheet 1
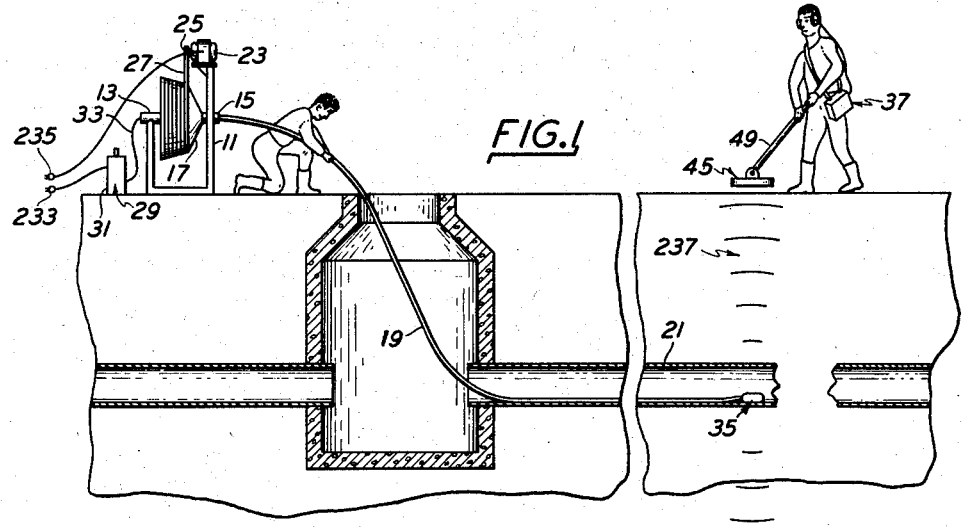
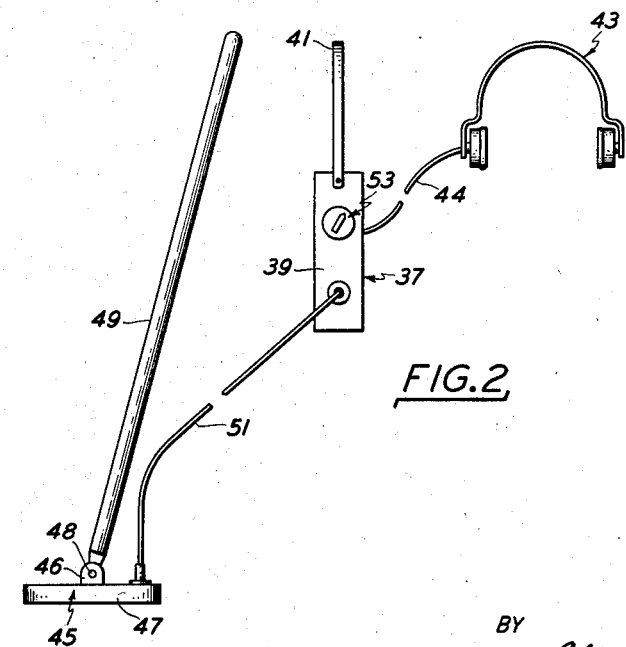
INVENTOR.
ROBERT J. NEFF
BY
Albert L. Jeffers
ATTORNEY

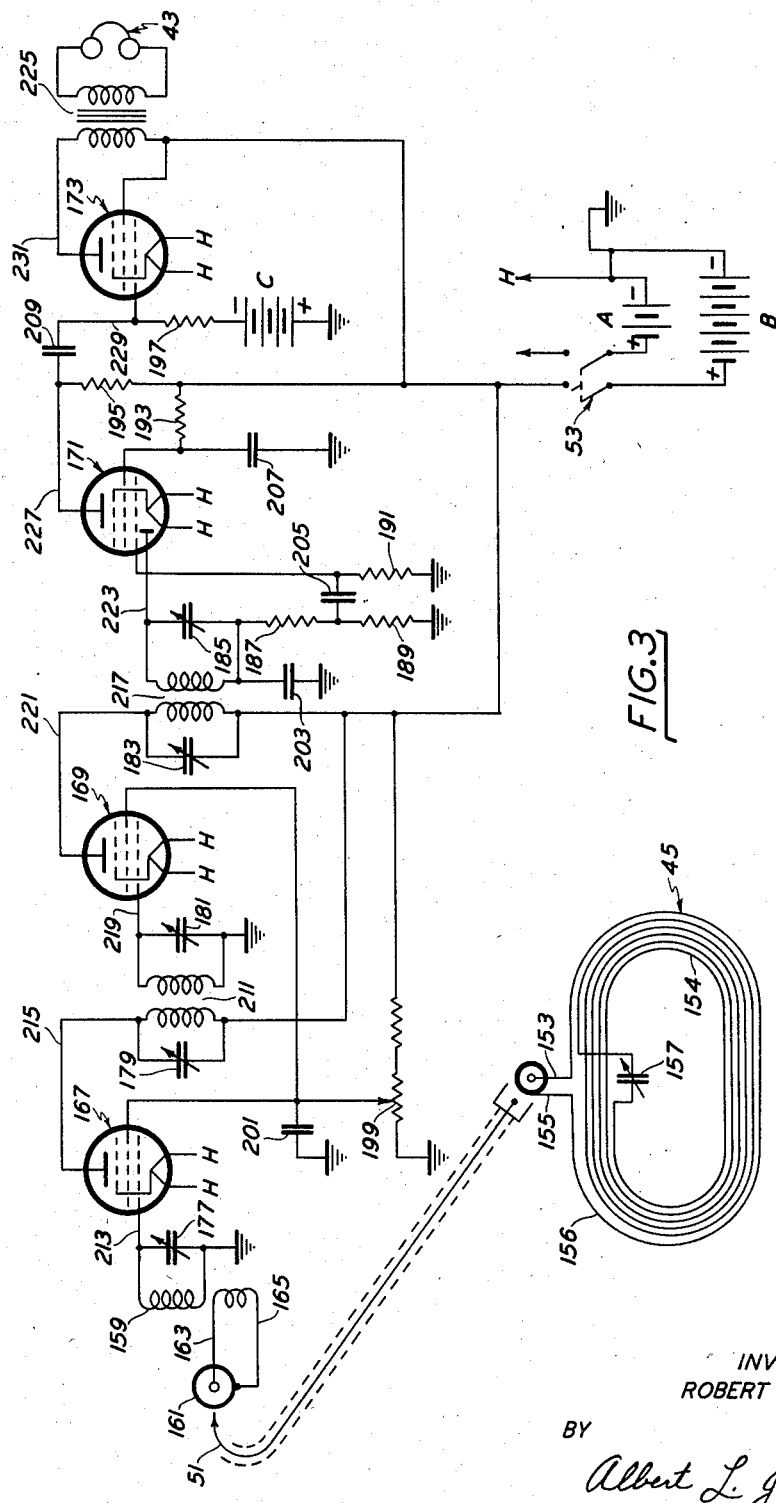

Oct. 13, 1959

R. J. NEFF 2,908,863

ELECTRONIC LOCATOR

Filed Feb. 18, 1955

INVENTOR.
ROBERT J. NEFF
BY
Albert L. Jeffers
ATTORNEY

2,908,863

ELECTRONIC LOCATOR

Robert J. Neff, Medway, Ohio

Application February 18, 1955, Serial No. 489,119

3 Claims. (Cl. 324—67)

This invention relates to electronic apparatus for locating obstructions in a sewer line, and it relates more particularly to signaling devices for locating, or tracing the course of, conduits, drain lines, pipe lines or sewer lines beneath the ground.

Sewer or drain lines frequently become broken or obstructed with tree roots and the like and must be repaired in order to restore normal flow in the line. A device commonly employed for such cleaning is a cutting element provided with a flexible cable, which is forced through the line. Occasionally the cutting element is stopped by obstructions or breaks in the line, which requires direct repair or replacement of sections of the line. The obstruction is sometimes difficult to locate, particularly inasmuch as sewer and drain lines are usually uncharted and are laid underground from one to twelve feet.

A principal object of the present invention is to provide an electronic locator for tracing the course of a sewer or drain line and locating the place of obstruction in the line.

An important object of the invention is to provide a rotating signal emitting device whereby the position of the emitting device can be accurately located at any time during its travel through a sewer or drain line.

A still further object of the invention is to provide a portable radio receiver for indicating the presence of the rotating signal emitting device.

Yet another object of the invention is the provision of means for directing the signal radially from the emitter.

With these objects definitely in view, together with other objects which will appear as this description proceeds, this invention resides in certain novel features of construction, combination and arrangement of elements as will be hereinafter described in detail in the specifications, particularly pointed out in the appended claims and illustrated in the accompanying drawings which form a material part of this application and in which:

Figure 1 is a perspective view of the apparatus disclosing an embodiment of the invention, the same being shown schematically in the position in which it is used;

Figure 2 is a side elevation of the complete radio receiver;

Figure 3 is an electrical diagram of the receiver circuit with the loop antenna included;

Figure 4:
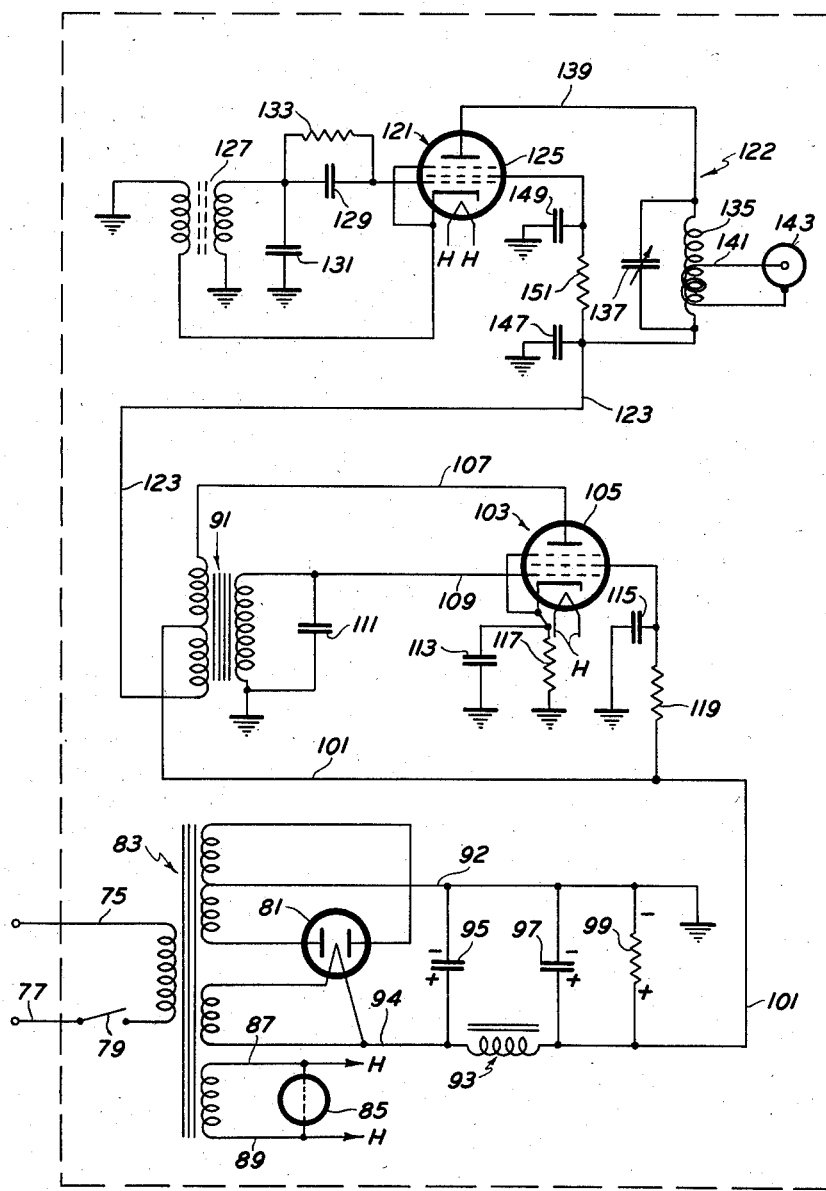
Figure 4 is a circuit diagram of the transmitter.

Referring specifically to Figure 1, there is disposed a supporting structure or frame 11 provided with journals 13 and 15. A circular reel 17 is rotatably mounted by the journals 13 and 15. A hollow flexible cable 19 is wound within the reel 17, and one end of the cable extends from the reel through an opening in the journal 15 which may be fed into the sewer or drain 21.

Suitable power means shown as an electric motor 23 mounted on the frame 11 is adapted to rotate the reel 17. This rotation is effected by a pulley wheel 25 mounted upon the shaft of the electric motor and a belt 27 adapted to engage the reel 17 and pulley wheel 25. Thus the rotation of the reel 17 imparts to the flexible cable a rotating movement.

I do not wish my invention to be limited to the structure shown for rotating the flexible cable as modification of design can be easily accomplished.

The transmitter 29 has the electrical equipment incorporated in a box 31. A coaxial cable 33 extends from the transmitter to a rotating jack 143, Figure 4, attached to journal 13, through an opening in journal 13 and through the center of the flexible cable 19 to the transmitter rotating antenna 35.

The receiver 37 has the electrical equipment incorporated in a housing 39 provided with a shoulder strap 41 for carrying the device. The receiver 37 is connected to the headphones 43 by a line 44 and a plug and jack (not shown). The loop antenna 45 is mounted in a rectangular frame 47 provided with an upwardly extending flange 46 which has an adjustable handle 49 connected thereto by a wing nut 48. The loop antenna is connected to the receiver 37 by line 51. The numeral 53 designates a switch for turning the receiver on or off and a volume control.

Figure 5:
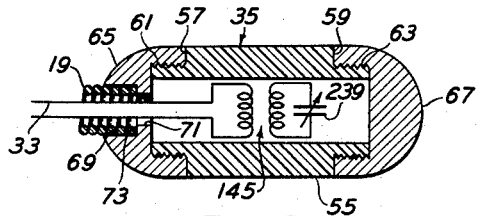
Figure 5 is a vertical section of the rotating transmitter antenna showing the construction of the housing.

Referring now to the detail section of the rotating antenna illustrated in Figure 5, the numeral 55 designates a cylindrical housing, preferably constructed of plastic material, which is adapted to emit the signal produced by the transmitter 29. The housing 55 is provided at each end with a radial shoulder 57 and 59 which terminate in a threaded axial boss 61 and 63 receiving partly spherical end caps 65 and 67. The end caps are preferably constructed of metal and serve as shields to reduce the emittance of the signal along the axis of the rotating shaft produced by the transmitter 29. Thus, when the antenna is rotated, the signal will have a radiating pattern. The end cap 65 is provided with a main bore 69 adapted to engage the flexible cable 19 and a smaller bore 71 receiving the coaxial cable 33. A radial shoulder 73 connects the small bore 71 with the main bore 69.

Referring now to the circuit diagram of the transmitter illustrated in Figure 4, the main power supply 75 and 77 supplies approximately 115 volt, 60 cycle current, upon the closing of a manually operated switch 79, to a full wave rectifying vacuum tube 81 through a power transformer 83. A pilot lamp 85 and heaters of the vacuum tubes 105 and 125 are connected to the power transformer through leads 87 and 89. The vacuum tube 81 is adapted to convert the A.C. power to approximately 300 volts D.C. The vacuum tube 81 is connected to an audio transformer 91 through lines 92, 94 and brute force filter 93 including electrolytic type capacitors 95, 97 and line 101 including a load resistor 99 which prevents the output voltage from becoming excessive during the warm-up period of the vacuum tubes.

The audio frequency oscillator and modulator designated by the assembly numeral 103 may be constructed in accordance with standard practice which includes a pentode receiving type vacuum tube 105 connected to the audio transformer 91 by leads 107, 109 and capacitors 111, 113 and 115 and resistors 117 and 119. The audio frequency oscillator generates approximately a 1000-cycle tone which is imposed on the D.C. power to the radio frequency circuit 122 by line 123.

The radio frequency oscillator designated by the assembly numeral 121 may be constructed in accordance with standard practice which includes a pentode type vacuum tube 125, resistor 151, condensers 147, 149, radio frequency transformer 127 provided with a powdered iron slug core, grid capacitor 129, tuning capacitor 131 and a grid leak resistor 133. A plate tank inductance 135 and a tuning condenser 137 are connected to the vacuum tube 125 by line 139. The link coupling inductance 141 connects the plate inductance 135 to the rotating jack 143 for the coaxial cable feeding the coils 145 in the rotating antenna. The radio frequency generated by the transmitter is approximately 450 kc.

Figure 3 illustrates in considerable detail the electrical circuit constituting the receiver apparatus. The loop antenna 45 is provided with a coil 154 tuned by the condenser 157 to the transmitter frequency of 450 kc. A small winding or link coil 156 having leads 153, 155 is disposed around the coil 154 for obtaining some of the energy at a reduced voltage which may be transferred to an input transformer 159 with a minimum of loss through line 51, jack 161, lines 163 and 165.

The remainder of the receiving circuit shows a number of features which are conventional. The amplifiers 167, 169, 171 and 173 are vacuum tubes of the pentode receiving type. The circuits include tuning capacitors 177, 179, 181, 183 and 185 and resistors 187, 189, 191, 193, 195 and 197. In the circuit is located a variable resistor 199 and capacitors 201, 203, 205, 207 and 209. The input transformer 159 delivers the signal to an interstage transformer 211 through line 213, amplifier 167 and line 215. From transformer 211 the signal is delivered to an output transformer 217 through line 219, amplifier 166 and line 221. From transformer 217 the signal is delivered to the diode element of a dual purpose vacuum tube 171 through line 223 whereby the audio frequency component of the amplified signal received from the transmitter is separated from the radio frequency carrier and amplified in the pentode section of vacuum tube 171. The audio signal is delivered from amplifier 171 to the final audio amplifier tube 173 through line 227, condenser 209 and line 229. The transformer 225 is connected to the audio amplifier tube 173 by line 231. The transformer 225 functions to isolate the headphones 43 from the high voltage plate supply of the amplifier tube 173 and operates to match the high output impedance of the amplifier tube 173 to the low input impedance of the headphones 43.

The A battery supplies current for heating the filaments of all the vacuum tubes and the B battery supplies current to the plate and screen grids of all the vacuum tubes. The C battery is a bias battery which provides the negative voltage to the input grid of the amplifier 173.

I do not wish my invention to be limited to the circuits or types of instruments shown either in the transmitter or the receiver as modification of design in either can be easily accomplished.

In practice with a fully clogged or impeded drain or sewer, it is in order initially to locate the exact point of difficulty. To this end, the electronic locator is employed. In the manual operation of the locator, the plugs 233 and 235 are connected to a 110 A.C. outlet and the motor 23 is energized thus rotating the reel 17 which imparts a slow rotation to the flexible cable 19 and antenna 35. The antenna is fed into the drain or sewer until it reaches the clogged or impeded location. The transmitter 29 is energized by closing switch 79 which transmits a radial signal from the antenna 35 as illustrated by the numeral 237 in Figure 1. The signal is received by the loop antenna 45 which denotes a maximum tone when the coil 145 provided with a tuning capacitor 239 is parallel and in line with the loop antenna 45.

It has been determined that a high frequency signal transmitted into a sewer or drain line containing water will have a tendency to flow along the line making the exact location of the antenna very difficult. Therefore, it is to be understood that a critical feature of this invention is the rotation of the antenna to provide an intermittent or a miximum and minimum signal. When the antenna is rotated, the undesired portion of the signal has a tendency to flatten or fade gradually with distance which allows the exact location of the antenna to be accurately determined.

Obviously many modifications and variations of the invention, as hereinbefore set forth, may be made without departing from the spirit and scope thereof, but only such limitations should be imposed as are indicated in the appended claims.

I claim:

1. An apparatus for tracing the path of a sewer line comprising, in combination, a remote transmitter and receiver, a bi-directional antenna, means for rotating the antenna including a hollow, flexible cable having a coaxial cable therein for connecting the antenna with the transmitter to give a continuous maximum and minimum radio frequency signal and means operatively connected to the receiver for indicating the location of the antenna.

2. An apparatus for tracing the path of a disposal line comprising, in combination, a remote transmitter and receiver, a bi-directional antenna connected to the transmitter, means for rotating the antenna to give a continuous maximum and minimum radio frequency signal, means for preventing the axial emission of the signal and means operatively connected to the receiver for indicating the position of the antenna.

3. An apparatus for tracing the path of a disposal line beneath the ground comprising, in combination, a remote transmitter and receiver, a rotating bi-directional antenna connected to the transmitter for transmitting a continuous maximum and minimum radio frequency signal, shield means for preventing the axial emission of the signal and means for indicating the position of the rotating antenna.

References Cited in the file of this patent

UNITED STATES PATENTS

| | | |
|---|---|---|
| 1,926,327 | Burrell et al. | Sept. 12, 1933 |
| 2,092,951 | Blake | Sept. 14, 1937 |
| 2,175,252 | Carter | Oct. 10, 1939 |
| 2,532,551 | Jarvis | Dec. 5, 1950 |
| 2,601,248 | Brenholdt | June 24, 1952 |
| 2,711,533 | Litchford | June 21, 1955 |